UNITED STATES PATENT OFFICE.

MATHIAS EUGEN OSCAR LIEBREICH, OF BERLIN, GERMANY.

PROCESS OF MAKING ARTIFICIAL BUTTER.

SPECIFICATION forming part of Letters Patent No. 611,495, dated September 27, 1898.

Application filed June 25, 1898. Serial No. 684,513. (No specimens.)

*To all whom it may concern:*

Be it known that I, MATHIAS EUGEN OSCAR LIEBREICH, a subject of the King of Prussia, German Emperor, residing at Berlin, in the Kingdom of Prussia and German Empire, have invented a certain new and useful Improvement in the Manufacture of Artificial Butter, of which the following is a specification.

My invention relates to an improved process of manufacturing margarin or artificial butter, which as heretofore produced required the employment of milk as an admixture to be added to and combined with suitable fatty or oily substances.

According to my invention I may dispense with the use of milk altogether by employing in lieu thereof as suitable admixture to the said fats a substance which is contained in and obtained from certain fruits—such as cocoanuts, almonds, hazel-nuts, &c.—in the form of a watery solution and which is known as "emulsin" or "synaptase." I prefer to use sweet almonds for preparing such aqueous solution containing the emulsin, which I obtain from said fruit in the usual manner by extracting the latter by means of water after they have been triturated and have or have not been freed of their fatty substances. The aqueous solution of emulsin thus obtained is then intimately mixed with the well-known fats generally employed in the manufacture of artificial butter and the originating emulsion treated in the usual way—that is to say, pressed, cooled, salted, colored—all of which is well known to those versed in the art and therefore requiring no further explanation.

While I do not confine myself to any fixed proportions, I may mention that I found good results to be obtained by adding ten parts, by weight, more or less, of cold water to one part, by weight, of triturated almonds previously freed of their fat and by admixing, say, fifty parts, by weight, of such solution to one hundred parts, by weight, of the fats or oily substances generally employed in the manufacture of margarin as heretofore practiced.

I may use the almonds or said other suitable fruit as well in their fresh or dried state for preparing the said solution containing the emulsin, and I may, as heretofore stated, obtain it by mixing the triturated almonds still containing their fat with cold water (almond-milk) or by extracting triturated almond-cakes by means of cold water.

I do not confine myself to any special mode of preparing the solution containing the emulsin or synaptase or to any fixed proportions of admixing the same to the fatty substances for obtaining the proper emulsion required in the manufacture of margarin or artificial butter; but What I do claim as my invention, and desire to secure by Letters Patent, is—

The herein-described process of manufacturing artificial butter from fats which consists in producing an emulsion of the fats by combining therewith a suitable admixture of an aqueous solution containing emulsin, substantially in the proportions described, and subsequently subjecting the emulsion to the ordinary finishing steps, substantially as described.

In testimony whereof I have hereunto set my hand in presence of two subscribing witnesses.

MATHIAS EUGEN OSCAR LIEBREICH.

Witnesses:
  H. MICHAELIS,
  C. H. DAY.